United States Patent
Chung et al.

(10) Patent No.: US 11,108,039 B2
(45) Date of Patent: Aug. 31, 2021

(54) NEGATIVE ELECTRODE CONTAINING ELECTRODE PROTECTIVE LAYER AND LITHIUM SECONDARY BATTERY COMPRISING THE SAME

(71) Applicant: LG CHEM, LTD., Seoul (KR)

(72) Inventors: Chanyeup Chung, Daejeon (KR); Minchul Jang, Daejeon (KR); Kyoung Hoon Kim, Daejeon (KR); Youngcheol Choi, Daejeon (KR); Byoungkuk Son, Daejeon (KR); Junghun Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 386 days.

(21) Appl. No.: 16/303,045

(22) PCT Filed: May 30, 2018

(86) PCT No.: PCT/KR2018/006153
§ 371 (c)(1),
(2) Date: Nov. 19, 2018

(87) PCT Pub. No.: WO2019/013449
PCT Pub. Date: Jan. 17, 2019

(65) Prior Publication Data
US 2020/0381713 A1    Dec. 3, 2020

(30) Foreign Application Priority Data

Jul. 13, 2017  (KR) .................. 10-2017-0089115

(51) Int. Cl.
*H01M 4/36*   (2006.01)
*H01M 4/66*   (2006.01)
(Continued)

(52) U.S. Cl.
CPC ........... *H01M 4/366* (2013.01); *H01M 4/134* (2013.01); *H01M 4/662* (2013.01); *H01M 10/0525* (2013.01); *H01M 2004/027* (2013.01)

(58) Field of Classification Search
CPC ...... H01M 4/366; H01M 4/134; H01M 4/662; H01M 10/0525
See application file for complete search history.

(56) References Cited

U.S. PATENT DOCUMENTS

| 4,645,726 A | 2/1987 | Hiratani et al. |
| 6,737,197 B2 | 5/2004 | Chu et al. |

(Continued)

FOREIGN PATENT DOCUMENTS

| CN | 1415123 A | 4/2003 |
| CN | 102177604 A | 9/2011 |

(Continued)

OTHER PUBLICATIONS

European Search Report for Appl. No. 18804499.4 dated Jun. 13, 2019.

*Primary Examiner* — Jayne L Mershon
(74) *Attorney, Agent, or Firm* — Birch, Stewart, Kolasch & Birch, LLP

(57) ABSTRACT

A negative electrode including an electrode protective material and a lithium secondary battery including the negative electrode, wherein the negative electrode containing the protective material can inhibit the growth of lithium dendrite on the surface of the electrode, effectively transfer lithium ions to the lithium metal electrode and has an excellent ion conductivity, and thus the protective layer itself including the protective material does not act as a resistive layer, overvoltage is not applied during charging and discharging, thereby preventing degradation of the performance of the battery and ensuring stability when driving the battery.

10 Claims, 2 Drawing Sheets

(51) Int. Cl.
*H01M 4/134* (2010.01)
*H01M 10/0525* (2010.01)
*H01M 4/02* (2006.01)

(56) References Cited

U.S. PATENT DOCUMENTS

| | | |
|---|---|---|
| 7,514,180 B2 | 4/2009 | Li |
| 2004/0126653 A1 | 7/2004 | Visco et al. |
| 2005/0089757 A1 | 4/2005 | Bannai et al. |
| 2005/0118507 A1 | 6/2005 | Guterman et al. |
| 2009/0155676 A1 | 6/2009 | Zhamu et al. |
| 2011/0189546 A1 | 8/2011 | Ikeda |
| 2011/0311875 A1 | 12/2011 | Lee et al. |
| 2012/0276459 A1 | 11/2012 | Im et al. |
| 2013/0017441 A1 | 1/2013 | Affinito et al. |
| 2014/0062411 A1 | 3/2014 | Mikhaylik et al. |
| 2014/0186716 A1 | 7/2014 | Wu et al. |
| 2014/0315097 A1 | 10/2014 | Tan et al. |
| 2015/0295246 A1 | 10/2015 | Son et al. |
| 2017/0141402 A1* | 5/2017 | Affinito ............. H01M 10/0525 |
| 2017/0179544 A1 | 6/2017 | Lin et al. |
| 2017/0317337 A1* | 11/2017 | Hayashi ............... H01M 4/1315 |
| 2019/0181448 A1* | 6/2019 | Horikawa ............. H01M 4/525 |

FOREIGN PATENT DOCUMENTS

| | | |
|---|---|---|
| CN | 103718337 A | 4/2014 |
| CN | 103915604 A | 7/2014 |
| CN | 105280886 A | 1/2016 |
| CN | 106654172 A | 5/2017 |
| JP | 6-101335 B2 | 12/1994 |
| JP | 2943127 B2 | 8/1999 |
| JP | 2003-303618 A | 10/2003 |
| JP | 2005-174924 A | 6/2005 |
| JP | 2011-54457 A | 3/2011 |
| JP | 2012-509564 A | 4/2012 |
| JP | 2016-511521 A | 4/2016 |
| JP | 2017-117781 A | 6/2017 |
| KR | 2002-0059781 A | 7/2002 |
| KR | 10-2005-0070053 A | 7/2005 |
| KR | 10-0953543 B1 | 4/2010 |
| KR | 10-2011-0131278 A | 12/2011 |
| KR | 10-2012-0122674 A | 11/2012 |
| KR | 10-2016-0052351 A | 5/2016 |
| KR | 10-1621410 B1 | 5/2016 |
| KR | 10-2016-0118962 A | 10/2016 |
| KR | 10-2017-0061866 A | 6/2017 |
| WO | WO 01/39303 A1 | 5/2001 |
| WO | WO 2004/036669 A2 | 4/2004 |

* cited by examiner

【Figure 1】
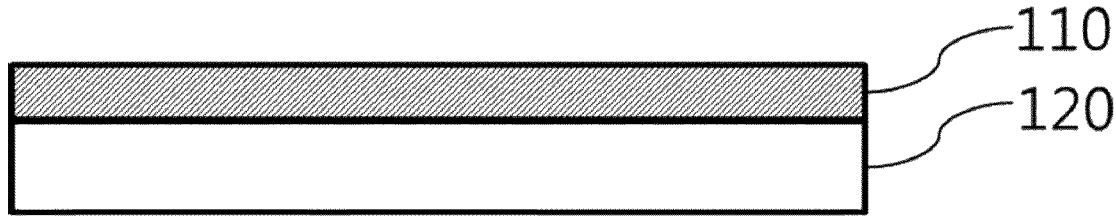
100
【Figure 2】
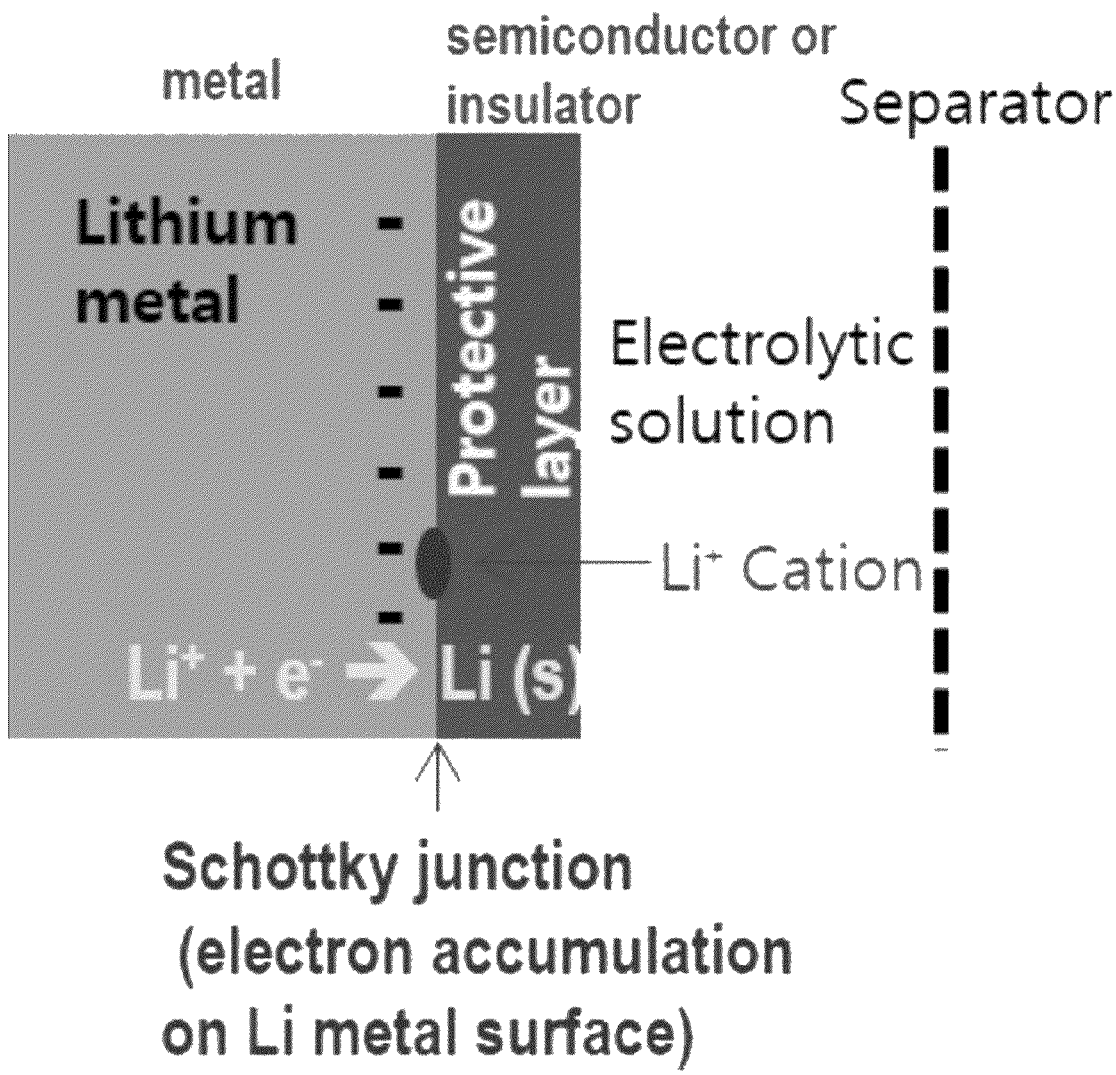

[Figure 3]
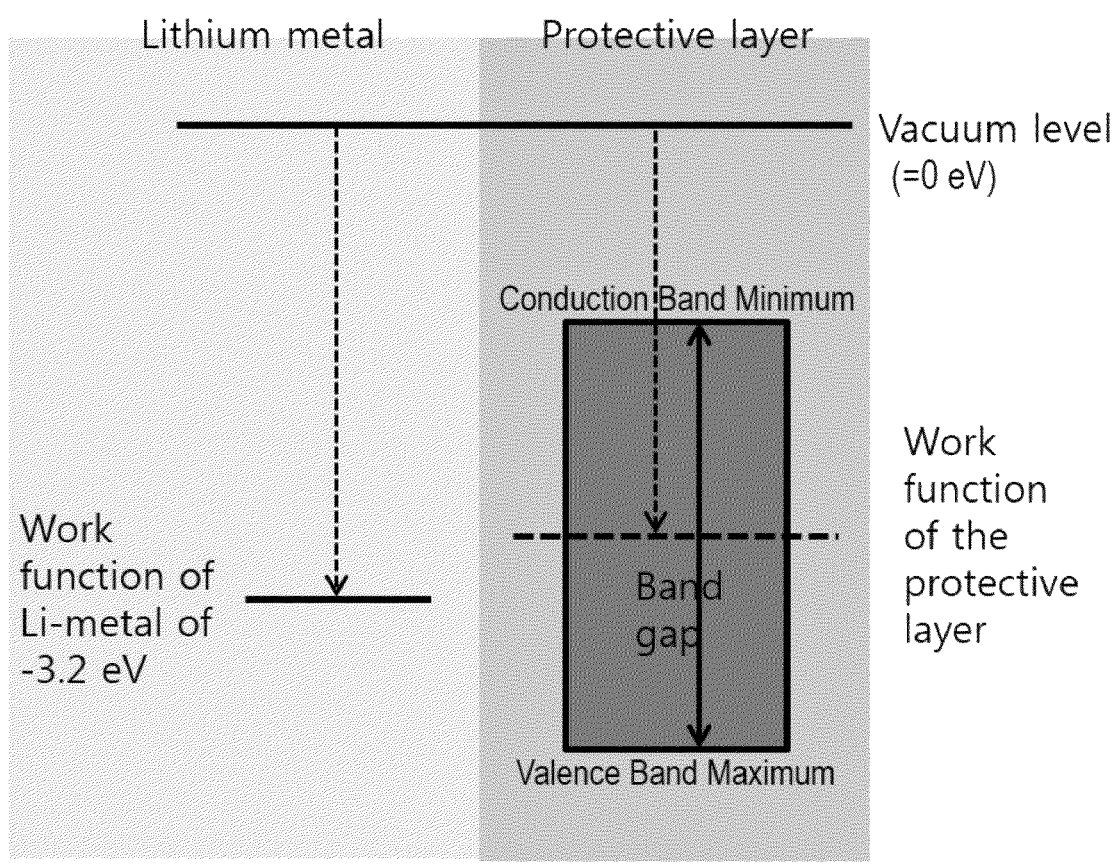

NEGATIVE ELECTRODE CONTAINING ELECTRODE PROTECTIVE LAYER AND LITHIUM SECONDARY BATTERY COMPRISING THE SAME

TECHNICAL FIELD

The present application claims the benefit of Korean Patent Application No. 10-2017-0089115 filed on Jul. 13, 2017, all the contents of which are incorporated herein by reference.

The present invention relates to a negative electrode comprising an electrode protective layer and a lithium secondary battery containing the same, and more particularly, to a negative electrode containing a protective material that forms a Schottky junction with lithium metal, which can effectively inhibit the growth of dendrites and has a high ion conductivity, and a lithium secondary battery using the negative electrode.

BACKGROUND ART

Recently, there is increasing interest in energy storage technology. As the application area thereof extends to the energy for mobile phones, camcorders, notebook PCs, and even electric vehicles, the effort of research and development of electrochemical devices is being carried out more and more concretely.

Electrochemical devices are the most noteworthy area in this respect, and among them, the development of a secondary battery capable of charging/discharging is the focus of attention. Recently, in developing these batteries, research and development on the design of new electrodes and batteries have been conducted in order to improve capacity, density and energy efficiency.

Among the secondary batteries currently being applied, the lithium secondary batteries developed in the early 1990s are attracting much attention as there is an advantage in that it has much higher operating voltage and energy density than conventional batteries such as Ni-MH, Ni—Cd, and sulfuric acid-lead batteries using an electrolyte solution in the form of an aqueous solution.

The lithium secondary battery has a laminated or wound structure of the electrode assembly including a positive electrode, a negative electrode, and a separator interposed between the positive electrode and the negative electrode and is constructed by placing the electrode assembly in a battery case and injecting a non-aqueous electrolytic solution therein. The lithium secondary battery produces electrical energy by the oxidation/reduction reaction when a lithium ion is inserted/desorbed from a positive electrode and a negative electrode.

Typically, the negative electrode of the lithium secondary battery uses lithium metal, carbon and the like as the active material, the positive electrode uses lithium oxide, a transition metal oxide, a metal chalcogen compound, a conductive polymer and the like as an active material.

In the case of the lithium secondary batteries using lithium metal as a negative electrode among them, a lithium foil attached to the copper collector or lithium metal sheet itself is mostly used as an electrode. Lithium metal has attracted great interest as a negative electrode material with high capacity due to its low potential and high capacity.

When lithium metal is used as a negative electrode, non-uniformity of electron density may occur on the surface of lithium metal due to various factors when driving the battery. As a result, lithium dendrites in the form of branches of a tree are formed on the surface of the electrode, and protrusions are formed or grown on the surface of the electrode, and thus the surface of the electrode becomes very rough. These lithium dendrites cause deterioration of the performance of the battery and, in serious cases, damage of the separator and short circuit of the battery. As a result, the temperature in the battery rises and thus there is a risk of explosion and fire of the battery.

In order to solve these problems, currently, studies on the introduction of a polymer protective layer or an inorganic solid protective layer to the lithium metal layer, the increase of salt concentration in electrolytic solution or the application of appropriate additives have been carried out. However, the effects of these studies on lithium dendrite inhibition is insufficient. Therefore, applying the protective material of the lithium metal negative electrode to solve the problems can be an effective alternative.

PRIOR ART DOCUMENTS

Patent Documents (Patent Document 1) Korean Patent Publication No. 10-1621410, "LITHIUM ELECTRODE AND LITHIUM SECONDARY BATTERY CONTAINING THE SAME";

(Patent Document 2) Korean Patent Publication No. 10-2016-0052351, "LITHIUM METAL ELECTRODE FOR LITHIUM SECONDARY BATTERY WITH SAFE PROTECTIVE LAYER AND LITHIUM SECONDARY BATTERY COMPRISING THE SAME";

(Patent Document 3) Korean Patent Publication No. 10-2011-0131278, "IONICALLY CONDUCTIVE COMPOSITES FOR PROTECTION OF ACTIVE METAL ANODES."

DISCLOSURE

Technical Problem

As described above, the lithium dendrites in the lithium secondary battery are precipitated on the surface of the negative electrode, which may lead to volume expansion of the cell. Therefore, as a result of various studies, the inventors of the present invention have discovered a method for solving the problems caused by the dendrites by applying a protective material of a lithium metal negative electrode and completed the present invention.

Accordingly, it is an object of the present invention to solve the problem of volume expansion due to the lithium dendrites through the application of a protective material to a lithium metal negative electrode, and to provide a lithium secondary battery having improved battery performance.

Technical Solution

In order to achieve the above object, the present invention relates to a negative electrode for a lithium secondary battery, comprising a lithium metal layer; and a protective layer formed on at least one side of the lithium metal layer, characterized in that the protective layer includes a material that forms a Schottky junction with lithium metal.

The present invention also provides a lithium secondary battery comprising the negative electrode.

Advantageous Effects

The negative electrode comprising the electrode protective material according to the present invention can inhibit the growth of lithium dendrites on the surface of the negative electrode, and at the same time effectively transfer lithium ion to the lithium metal electrode, and the negative electrode has excellent ion conductivity, and thus the protective layer itself, including the protective material, does not act as a resistive layer, so overvoltage does not occur during charging and discharging, and therefore, the performance of the battery can be prevented from deteriorating and the stability can be ensured when the battery is driven.

Therefore, the lithium electrode including the electrode protective material proposed in the present invention can be suitably applied to the negative electrode of a lithium secondary battery, and the lithium electrode can be applied to various devices, for example, from smallest electronic devices using lithium metal as a negative electrode to large energy storage devices.

DESCRIPTION OF DRAWINGS

FIG. 1 is a cross-sectional view of a negative electrode for a lithium secondary battery according to an embodiment of the present invention.

FIG. 2 is a schematic view of a protective layer that forms a Schottky junction with lithium metal.

FIG. 3 is a schematic view showing a work function and band gap of a material contained in a protective layer.

BEST MODE

Hereinafter, the present invention will be described in detail with reference to the accompanying drawings so that those skilled in the art can easily carry out the present invention. However, the present invention can be embodied in various different forms and is not limited to the description set forth herein.

The present invention provides, as shown in FIG. 1, a negative electrode 100 for a lithium secondary battery, comprising a lithium metal layer (120) and a protective layer (110) formed on at least one side of the lithium metal layer, characterized in that the protective layer comprises a material that forms a Schottky junction with lithium metal.

The protective layer forms a Schottky junction with lithium metal. In this case, electrons cannot migrate from the lithium metal to the protective layer, and electrons accumulate only at the interface between the lithium metal and the protective layer. Therefore, it is possible to realize a lithium secondary battery in which the oxidation-reduction reaction of lithium occurs only at the interface between the lithium metal and the protective layer, thereby preventing lithium precipitation of the dendrite form; at the same time, the negative electrode of lithium metal is protected from electrolytic solution etc.; electrochemical charging/discharging is more stable; and the effect of improving cycle performance is maximized.

Hereinafter, the lithium metal layer constituting the negative electrode for the lithium secondary battery of the present invention, the lithium metal protective layer, and the lithium secondary battery using the lithium metal layer will be described in detail Lithium Metal Layer In general, when lithium metal is used as a negative electrode, the following problems are occurred. First, lithium is an alkali metal and explosively reacts with water, thereby making it difficult to manufacture and use in general environments. Second, when lithium is used as a negative electrode, lithium reacts with the electrolyte or water, impurities in the battery, lithium salt, etc. to form a passive layer, and this layer causes a localized current density difference to form dendritic lithium dendrites. In addition, the dendrites thus formed grow through the pores of the separator and then cause a direct internal short circuit with the positive electrode, which causes the battery to explode. Third, lithium is a soft metal and its mechanical strength is weak, and thus it is very difficult to use without additional surface treatment.

The lithium metal layer according to the present invention may be a lithium metal plate or a metal plate having a lithium metal thin film formed on a negative electrode current collector. At this time, the method of forming the lithium metal thin film is not particularly limited, and a known method for forming a metal thin film, such as a lamination method, a sputtering method, or the like, can be used. Also, the case, where the metal lithium thin film is formed on the metal plate by the initial charging after assembling the battery without the lithium thin film on the collector, is also included in the lithium metal plate of the present invention.

The negative electrode current collector is not particularly limited as long as it has high electrical conductivity without causing a chemical change in the battery. The negative electrode current collector may be selected from the group consisting of copper, aluminum, stainless steel, zinc, titanium, silver, palladium, nickel, iron, chromium, alloys thereof, and combinations thereof. The stainless steel may be surface-treated with carbon, nickel, titanium or silver. The alloy may be an aluminum-cadmium alloy, besides, it may be a baked carbon, a non-conductive polymer surface-treated with a conductive material, a conductive polymer or the like. In general, a copper plate is used as the negative electrode current collector.

The width of the lithium metal plate may be adjusted to facilitate the manufacture of the electrode depending on the shape of the electrode. The thickness of the lithium metal plate may be 10 to 300 µm.

Lithium Metal Protective Layer

The protective layer according to the present invention may include a material that forms a Schottky junction with lithium metal, and the material contained in the protective layer must be a semiconductor or a nonconductor with a band gap. Also, the ion conductivity of lithium ion should be excellent.

In general, when the lithium secondary battery has no protective layer on the surface of the lithium metal negative electrode, there is a problem that lithium cations during charging and discharging of the battery have a dendrite shape while being reduced on the surface of lithium metal, and so on, and thus are precipitated in an abnormal shape, and penetrate into the separator of the battery and contact the positive electrode of the battery, thereby causing an internal short circuit.

Therefore, when a general lithium ion conductor or a metal material that does not form the Schottky junction with lithium metal is used as a protective layer, the lithium ions migrated through the electrolytic solution are reduced in the inside of the protective layer or on the surface of the protective layer and then precipitated in the dendrite form.

Accordingly, in the present invention, a material that forms a Schottky junction with lithium metal may be included, and the protective layer may be a semiconductor or nonconductor having a band gap.

The Schottky junction refers to a structure in which metal and a semiconductor are in contact with each other, and the voltage-current characteristic exhibits rectification properties. That is, it means that the current flows easily in a certain direction and the current hardly flows in the reverse direction. The direction in which the current is likely to flow is referred to as the forward direction, and the direction in which the current does not flow is referred to as the reverse direction. The reason why the Schottky junction shows rectification properties is because work functions of metal and semiconductor are different, and thus potential barrier is formed at the junction.

When the Fermi level of the material contained in the protective layer provided in the present invention is higher than the Fermi level of the lithium metal, if the material contained in the protective layer come into contact with the lithium metal, a Schottky junction is formed, and the electrons can migrate from the protective layer to the lithium metal, but the electrons cannot move in the opposite direction, and thus the electrons are accumulated at the interface between the lithium metal and the protective layer.

Therefore, the lithium cations migrated from the electrolytic solution are reduced by the electrons, which are passed through the protective layer and accumulated at the interface between the lithium metal and the protective layer, and thus are precipitated as lithium metal only at the interface, thereby being possible to prevent the precipitation of lithium in the form of dendrite in the inside of the protective layer or on the surface of the protective layer that is not in contact with the lithium metal.

In order to achieve this Schottky junction, the work function of the material contained in the protective layer must be greater than the work function of the lithium metal layer and the material should have a band gap.

The work function refers to the energy difference required when one electron moves between the highest level (Fermi level), where the electrons of a certain substance are full, and the potential level outside the substance. 1 eV refers to the work or energy required when one electron moves a potential difference of 1V.

The band gap refers to an energy region, in which there is no electron state, between energy bands representing the electron state of a crystalline substance, and usually refers to the energy gap between the valence band occupied by electrons and the vacant conduction band.

If the energy gap of the band gap between valence band fully occupied by electrons and the completely-empty conduction band is much greater than the energy at room temperature, electrons cannot move because the probability that the electrons rise to the excited state of the conduction band is close to zero. On the contrary, if the energy gap of the band gap is equal to or smaller than the energy corresponding to the room temperature, electrons in the valence band can easily be raised to the conduction band beyond the band gap, and the electrons in this excited state and the electron holes in the valence band can move relatively freely, so that they serve as charge carriers to make current flow.

Therefore, if the work function of the material contained in the protective layer provided in the present invention is smaller than the work function of lithium metal, electrons move easily as compared with lithium metal, and if the material is a conductor that does not have a band gap, the electrons move easily beyond the band gap to the conduction band and can freely move, which makes the current flow easier. Therefore, in order for electrons to accumulate at the interface between the lithium metal surface and the protective layer, the material should be a non-conductor or semiconductor having a work function larger than the lithium metal layer and having a band gap.

Therefore, the work function of the lithium metal protective layer of the present invention may be higher than the work function of lithium metal of −3.27 eV, as determined by the density function method.

In addition, the lithium metal protective layer of the present invention may have a band gap of 0.4 eV or more.

The protective layer provided in the present invention may have a thickness of 1 to 5,000 nm. If the thickness is smaller than the above range, the function of the protective layer may be deteriorated, and if the thickness is larger than the above range, the protective layer can act as a resistor. Therefore, it can be appropriately selected within the above range.

Since the material contained in the protective layer provided in the present invention must have a high ion conductivity for lithium ion, the activation energy ($E_a$) needs to be small in order to facilitate the movement of lithium ions within the crystal lattice.

Korean Patent Publication No. 10-2011-0131278 exemplifies $Li_3P$ as the protective layer of the lithium negative electrode, but in the case of the protective layer containing $Li_3P$, it is not easy to manufacture because it must be synthesized by using expensive monocrystalline Black-P, and also since the activation energy for the movement of lithium ions inside the crystal lattice in the protective layer is relatively high as 0.995 eV, as calculated by the DFT-NEB method (Density functional theory-Nudged elastic band method), a protective layer with better lithium ion conductivity is required.

Therefore, the lithium metal protective layer according to the present invention may have an activation energy for migration of lithium ions of 0.95 eV or less.

In the present invention, the lithium metal protective layer may comprise at least one selected from the group consisting of $Li_7SbO_6$, $Li_3LaSb_2$, $Li_3NaSi_6$, $LiBeSb$, $Li_3Sb$, $LiMgP$ and $Li_3As$ as materials which form a Schottky junction with lithium metal, have a band gap, and have a small activation energy for lithium ion migration.

The lithium metal protective layer provided in the present invention has a small activation energy for migration of lithium ions and thus may have ion conductivity of $10^{-7}$ S/cm or more at room temperature, preferably $10^{-7}$ S/cm or more and $10^{-1}$ S/cm or less.

Table 1 shows work function, band gap, activation energy ($E_a$) value of a material applicable to the protective layer.

TABLE 1

| Protective layer material | Work function [eV] | Band gap (GW or HSE06) [eV] | $E_a$ (NEB) [eV] |
|---|---|---|---|
| $Li_7SbO_6$ | −2.747 | 5.24 | 0.186 |
| $Li_3LaSb_2$ | −2.830 | 0.48 | 0.247 |
| $Li_3NaSi_6$ | −3.086 | 0.65 | 0.436 |
| LiBeSb | −2.747 | 1.38 | 0.544 |
| $Li_3Sb$ | −3.032 | 1.05 | 0.702 |
| LiMgP | −3.075 | 0.50 | 0.775 |
| $Li_3As$ | −2.900 | 1.24 | 0.913 |

In Table 1, work function, band gap, and the activation energy of lithium ion diffusion can be obtained through electronic structure calculation based on density functional theory.

The electronic structure calculation can be performed based on the GGA-PBE (Generalized gradient approximation-Perdew, Burke, Ernzerhof method) function as an exchange-correlation that simulates the interaction between electrons and electrons, and the kinetic energy cutoff of electrons can be 500 eV. For the structure optimization, it is possible to obtain the optimum structure by the conjugate gradient method by repeating calculations until the interatomic force becomes 0.01 eV/Å or less.

For the work function, it can be calculated by making a slab structure that exposes the closed-packing plane in the crystalline structure of each material to the surface, and then performing structure optimization with the GGA-PBE method, calculating the local potential of this slab model with vacuum, and using the difference from the Fermi level.

For the band gap, it can be calculated by the difference between CBM (conduction band minimum) and VBM (valence band maximum) by performing HSE06 (Hayd-Scuseria-Ernzerhof method) or GW (Green's function and screened Coulomb interaction) calculation based on the optimized structure using GGA-PBE function.

The activation energy ($E_a$) for lithium ion diffusion can be measured by the nudged elastic band (NEB) method. When the unit lattice size is smaller than 10 Å in one of the lattice constants of the x, y, and z-axes, after generating the supercell, the vacancy of the lithium ion is artificially created inside the lattice, and energy barriers that need to be overcome when neighboring lithium ions move to vacancy can be calculated. Three images can be used for calculation between the lattice (initial) structure, in which the vacancy of lithium ion is generated, and the lattice (final) structure, in which adjacent lithium ions migrate to a lithium vacancy site. A series of calculations can utilize the VASP (The Vienna Ab initio simulation package), which is a computation code based on the density function theory.

Referring to Table 1, it can be confirmed that these materials exhibit 1) a work function higher than −3.27 eV, which is the work function of lithium metal by the computation of the density function theory; are 2) semiconductors or non-conductors with a band gap higher than 0.4 eV; are 3) suitable as materials included in the lithium metal protective layer provided in the present invention due to the activation energy below 0.95 eV.

Table 1 shows the results for the compounds in the two-component or three-component based compounds composed of lithium and P, As, Si, and Sb elements, which have the work function of −3.27 eV or more and the band gap of 0.4 eV or more, as calculated by density function theory calculation, and have the activation energy for lithium ion diffusion of lower than 0.95 eV. In addition, other lithium compounds meeting the above conditions can also be used as a protective layer of lithium metal.

Lithium Secondary Battery

With respect to the rest of the configuration except for the structure and characteristics of the negative electrode described above, the lithium secondary battery according to the present invention can be manufactured through a well-known technique practiced by those skilled in the art and will be described in detail below.

The lithium secondary battery according to the present invention may be a secondary battery including a positive electrode, a negative electrode and the separator interposed therebetween, wherein the negative electrode may be the negative electrode described above.

Also, in the negative electrode, the lithium metal protective layer may be formed on the surface facing the positive electrode.

The positive electrode according to the present invention can be produced in the form of a positive electrode by coating a composition including a positive electrode active material, a conductive material and a binder on the positive electrode current collector.

The positive electrode active material may be any one selected from the group consisting of $LiCoO_2$, $LiNiO_2$, $LiMnO_2$, $LiMn_2O_4$, $Li(Ni_aCo_bMn_c)O_2$ ($0<a<1$, $0<c<1$, a+b+c=1), $LiNi_{1-y}CoyO_2$, $LiCo_{1-y}MnyO_2$, $LiNi_{1-y}Mn_yO_2$ ($0\leq y<1$), $Li(Ni_aCo_bMn_c)O_4$ ($0<a<2$, $0<b<2$, $0<c<2$, a+b+c=2), $LiMn_{2-z}NizO_4$, $LiMn_{2-z}CozO_4$ ($0<z<2$), $LiCoPO_4$ and $LiFePO_4$, or combinations of two or more. In addition to these oxides, sulfide, selenide and halide can also be used. In a more preferred embodiment, the positive electrode active material may be $LiCoO_2$ suitable for a high-power battery.

The conductive material is a component for further improving the electrical conductivity of the positive electrode active material. Non-limiting examples may include graphite such as natural graphite and artificial graphite; carbon blacks such as carbon black, acetylene black, Ketjen black, channel black, furnace black, lamp black, thermal black and Super-P; conductive fibers such as carbon fibers and metallic fibers; metallic powders such as carbon fluoride powders, aluminum powders and nickel powders; conductive whiskers such as zinc oxide and potassium titanate; conductive metal oxides such as titanium oxide; and conductive materials such as polyphenylene derivatives.

The binder has a function of holding a positive electrode active material in a positive electrode current collector and organically connecting positive electrode active materials, and for example, may be polyvinylidene fluoride (PVDF), polyvinyl alcohol (PVA), carboxymethyl cellulose (CMC), starch, hydroxypropyl cellulose, regenerated cellulose, polyvinylpyrrolidone, tetrafluoroethylene, polyethylene, polypropylene, ethylene-propylene-diene polymer (EPDM), sulfonated-EPDM, styrene-butadiene rubber, fluorine rubber or various copolymers thereof.

The positive electrode current collector is as described above in the negative electrode current collector. In general, the positive electrode current collector may be an aluminum thin plate.

The positive electrode composition can be coated on the positive electrode current collector using a conventional method known in the art. For example, various methods such as a spin coating method, a dipping coating method, a spray coating method, a roll court method, a gravure printing method, a bar court method, a die coating method, a comma coating method, or a mixing method thereof can be used.

After the coating process, the composition of the positive electrode and the positive electrode is followed by evaporation of the solvent or dispersion medium through the drying process, the denseness of the coating film, and the adhesion between the coating film and the collector. At this time, the drying is carried out according to a conventional method and is not particularly limited.

The separator according to the present invention is not particularly limited to the material but physically separates a positive electrode and a negative electrode and has an electrolyte and an ion permeability and can be used without any particular limitation as long as it is normally used as the separator in an electrochemical device. However, the separator is a porous, nonconductive or insulating material, and particularly preferably has low resistance to ion movement of an electrolytic solution and is excellent in an electrolytic solution humidifying ability. For example, a polyolefin-based porous membrane or a nonwoven fabric may be used, but it is not particularly limited thereto.

Examples of the polyolefin-based porous membrane may include a membrane formed from polyethylene such as high density polyethylene, linear low density polyethylene, low density polyethylene or ultra high molecular weight polyethylene, or polyolefin-based polymer such as polypropylene, polybutylene, or polypentene, either alone or in the form of a polymer mixture thereof.

The nonwoven fabric may be a nonwoven fabric formed from, besides the above-mentioned polyolefin-based nonwoven fabric, for example, polyphenyleneoxide, polyimide, polyamide, polycarbonate, polyethylene terephthalate, polyethylene naphthalate, polybutylene terephthalate, polyphenylenesulfide, polyacetal, polyethersulfone, polyetheretherketone, polyester, either alone or in the form of a polymer mixture thereof. Such nonwoven fabrics are in the form of fibers forming a porous web and include a spunbond or meltblown form composed of long fibers.

The thickness of the separator is not particularly limited, but is preferably in the range of 1 to 100 μm, more preferably in the range of 5 to 50 μm. If the thickness of the separator is less than 1 μm, the mechanical properties cannot be maintained, and if the thickness exceeds 100 μm, the separator acts as a resistive layer, thereby deteriorating the performance of the battery.

The pore size and porosity of the separator are not particularly limited, but it is preferable that the pore size is 0.1 to 50 μm and the porosity is 10 to 95%. If the separator has a pore size of less than 0.1 μm or a porosity of less than 10%, the separator acts as a resistive layer. If the separator has a pore size of more than 50 μm or a porosity of more than 95%, mechanical properties cannot be maintained.

The electrolyte applicable in the present invention may be a non-aqueous electrolyte solution or a solid electrolyte which does not react with lithium metal, preferably non-aqueous electrolyte, and includes an electrolyte salt and an organic solvent.

The electrolyte salt contained in the non-aqueous electrolyte solution is a lithium salt. As the lithium salt, lithium salts conventionally used in the electrolyte solution for the lithium secondary battery may be used without limitation. The anions of the lithium salts may include, for example, any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^1$ or a combination of two or more thereof As the organic solvent contained in the non-aqueous electrolyte solution, the organic solvents commonly used in the electrolyte solution for the lithium secondary battery may be used without limitation, and for example, ethers, esters, amides, linear carbonates, and cyclic carbonates, etc. may be used alone or in combination of two or more thereof. Among them, carbonate compounds which are representatively cyclic carbonates, linear carbonates, or a mixture thereof may be included.

Specific examples of the cyclic carbonate compound include any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinyl ethylene carbonate, and halides thereof, or a mixture of two or more thereof. Examples of these halides include, for example, but are not limited to, fluoroethylene carbonate (FEC) and the like.

In addition, specific examples of the linear carbonate compound include, but not limited thereto, any one selected from the group consisting of dimethyl carbonate (DMC), diethyl carbonate (DEC), dipropyl carbonate, ethylmethyl carbonate (EMC), methylpropyl carbonate and ethylpropyl carbonate or a mixture of two or more thereof.

Especially, among the carbonate-based organic solvents, cyclic carbonates such as ethylene carbonate and propylene carbonate are highly viscous organic solvents having high dielectric constant, so that the lithium salt in the electrolyte can be more easily dissociated. When such cyclic carbonates are mixed with the linear carbonates having a low viscosity and low dielectric constant, such as dimethyl carbonate and diethyl carbonate in an appropriate ratio, an electrolyte solution having a higher electric conductivity can be produced.

In addition, the ethers in the organic solvent may include, but not limited thereto, any one selected from the group consisting of dimethyl ether, diethyl ether, dipropyl ether, methylethyl ether, methylpropyl ether, and ethylpropyl ether, or a mixture of two or more thereof.

In addition, the esters in the organic solvent may include, but not limited thereto, any one selected from the group consisting of methyl acetate, ethyl acetate, propyl acetate, methyl propionate, ethyl propionate, propyl propionate, γ-butyrolactone, γ-valerolactone, γ-caprolactone, σ-valerolactone and ε-caprolactone, or a mixture of two or more thereof.

The injection of the non-aqueous electrolyte solution can be performed at an appropriate stage in the preparing process of the electrochemical device depending on the preparing process and the required physical properties of the final product. That is, the injection can be performed before assembling the electrochemical device or at the final stage for assembling the electrochemical device, etc.

The lithium secondary battery according to the present invention can be prepared by a lamination or stacking process and a folding process of the separator and the electrode in addition to a winding process which is a general process. In addition, the case of the battery may be a cylindrical shape, a square shape, a pouch shape, a coin shape or the like. Also, the lithium secondary battery including the negative electrode for the lithium secondary battery provided in the present invention may be a lithium metal battery, a lithium-sulfur battery or an all solid-state battery.

As described above, the lithium secondary battery according to the present invention stably exhibits excellent rate capacity, output characteristics, and capacity retention ratio, and therefore is useful for portable devices such as mobile phones, notebook computers and digital cameras, and electric vehicles such as hybrid electric vehicles (HEV).

Thus, according to another embodiment of the present invention, there is provided a battery module including the lithium secondary battery as a unit cell and a battery pack including the same. The battery module or the battery pack may be used as a power source of at least one medium or large-sized devices selected from a power tool; electric vehicles including an electric vehicle (EV), a hybrid electric vehicle, and a plug-in hybrid electric vehicle (PHEV); or a system for power storage.

Hereinafter, in order to explain the present invention in detail, the present invention will be described with reference to examples. However, the examples according to the present invention can be modified into various other forms, and the scope of the present invention should not be construed as being limited to the examples described below. The examples of the present invention are provided to more fully describe the present invention to those skilled in the art.

EXAMPLE 1

Preparation of Lithium Secondary Battery Containing Negative Electrode with $Li_7SbO_6$ Protective Layer A positive electrode was prepared using LCO ($LiCoO_2$) as a positive electrode active material. N-methylpyrrolidone (NMP) as a solvent was mixed at a weight ratio of LCO: Super-P: PVDF=95:2.5:2.5 to prepare a slurry and loaded at 450 mg/25cm², coated on the aluminum foil with a thickness of 12 μm to produce a positive electrode with a thickness of 70 μm.

$Sb_2O_3$ dispersed in the solvent of dimethylcarbonate (DMC) at a concentration of 5 wt. % was spin-coated on a lithium metal of 20 μm and dried at room temperature for 30 minutes to form a protective layer of $Li_7SbO_6$ with a thickness of 50 nm, and thus obtained a negative electrode.

After interposing a polyethylene separator having a thickness of 20 μm between the positive electrode and the negative electrode, an electrolytic solution containing 1.0M $LiPF_6$ as a lithium salt and 2 wt. % of vinylene carbonate (VC) as an additive in a solvent of ethylenecarbonate (EC): diethylcarbonate (DEC): dimethylcarbonate (DMC)=1:2:1 was injected to produce a lithium secondary battery.

EXAMPLE 2

Preparation of Lithium Secondary Battery Containing Negative Electrode with $Li_3Sb$ Protective Layer A lithium secondary battery was prepared in the same manner as in Example 1, except that Sb power instead of $Sb_2O_3$ in Example 1 was spin-coated to form $Li_3Sb$ as a protective layer.

COMPARATIVE EXAMPLE 1

Preparation of Lithium Secondary Battery Containing Negative Electrode with $Li_3P$ Protective Layer A lithium secondary battery was prepared in the same manner as in Example 1 except that $Li_3P$ instead of $Li_7SbO_6$ as a protective layer in Example 1 above was used.

COMPARATIVE EXAMPLE 2

Preparation of Lithium Secondary Battery Containing Negative Electrode with $Li_{21}Si_5$ Protective Layer A lithium secondary battery was prepared in the same manner as in Example 1 except that Si instead of $Li_7SbO_6$ as a protective layer in Example 1 above was used.

COMPARATIVE EXAMPLE 3

Preparation of Lithium Secondary Battery Containing Negative Electrode Without Protective Layer A lithium secondary battery was prepared in the same manner as in Example 1 except that the protective layer in Example 1 was not applied.

EXPERIMENTAL EXAMPLE

Evaluation of Battery Performance

The performance of each of the batteries manufactured in Examples 1 to 2 and Comparative Examples 1 to 3 was evaluated. At this time, the charging and discharging conditions are as follows:

charging: rate 0.2 C, voltage 4.25V, CC/CV (5% current cut at 1 C);

discharging: rate 0.5 C, voltage 3V, CC.

The cycle number was measured when the rate capability reached 80% in comparison with the initial capacity of the battery while repeating the cycle under the above conditions. The results are shown in Table 2 below.

TABLE 2

|  | Number of cycles at 80% of initial capacity |
| --- | --- |
| Example 1 | 97 |
| Example 2 | 84 |
| Comparative Example 1 | 63 |
| Comparative Example 2 | 12 |
| Comparative Example 3 | 17 |

As shown in Table 2, it was found that in Comparative Example 2 and Comparative Example 3, the ability to inhibit the growth of dendrite is reduced and the performance of the battery is reduced. Also, it can be seen that in the case of Comparative Example 1, although the lifetime of the battery was improved, there was difficulty in manufacturing process when applying $Li_3P$, or there was a disadvantage that the activation energy of the lithium ion movement inside the crystal lattice in the protective layer is relatively high and therefore, the lithium secondary battery with the protective layer containing the materials of Examples 1 and 2 shows better performance.

DESCRIPTION OF SYMBOLS

100: Negative electrode for lithium secondary battery,
110: Lithium metal protective layer,
120: Lithium metal layer.

The lithium-sulfur battery of the present invention suppresses the diffusion of polysulfide, thereby improving the electrode loading and initial rate capability, and ultimately increasing the energy density of the lithium-sulfur battery. As a result, the lithium-sulfur battery can be suitably applied as a high-density battery or a high-performance battery.

The invention claimed is:

1. A negative electrode for a lithium secondary battery, comprising:
   a lithium metal layer; and
   a protective layer formed on at least one side of the lithium metal layer, wherein the protective layer comprises a material that forms a Schottky junction with lithium metal, wherein the material is at least one selected from the group consisting of $Li_7SbO_6$, $Li_3LaSb_2$ $Li_3NaSi_6$, LiBeSb, LiMgP.

2. The negative electrode for the lithium secondary battery according to claim 1, wherein the material contained in the protective layer is a material having a work function larger than a work function of the lithium metal layer and having a band gap.

3. The negative electrode for the lithium secondary battery according to claim 2, wherein the band gap is 0.4 eV or more.

4. The negative electrode for the lithium secondary battery according to claim 1, wherein the protective layer has an ion conductivity of $10^{-7}$ S/cm or more at room temperature.

5. The negative electrode for the lithium secondary battery according to claim 1, wherein the protective layer has an activation energy for migration of lithium ions of 0.95 eV or less.

6. The negative electrode for the lithium secondary battery according to claim 1, wherein the protective layer has a thickness of 1 nm to 5,000 nm.

7. The negative electrode for the lithium secondary battery according to claim 1, wherein the lithium metal layer is formed by forming a lithium metal thin film on a current collector.

8. The negative electrode for the lithium secondary battery according to claim 7, wherein the collector comprises at least one selected from the group consisting of copper, aluminum, stainless steel, zinc, titanium, silver, palladium, nickel, iron, chromium, alloys thereof and combinations thereof.

9. A lithium secondary battery, comprising:
a positive electrode,
a negative electrode, and
a separator interposed between the positive electrode and the negative electrode,
wherein the negative electrode is the negative electrode for the lithium secondary battery according to claim 1.

10. The lithium secondary battery according to claim 9, wherein the negative electrode has a lithium metal protective layer formed on a surface facing the positive electrode.

* * * * *